(12) United States Patent
Roberts et al.

(10) Patent No.: US 7,769,305 B1
(45) Date of Patent: Aug. 3, 2010

(54) HIGH-SPEED DIGITAL SIGNAL PROCESSING IN A COHERENT OPTICAL RECEIVER

(75) Inventors: Kim B. Roberts, Nepean (CA); Han Sun, Nepean (CA); Chandra Bontu, Nepean (CA); Kuang Tsan Wu, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 853 days.

(21) Appl. No.: 11/533,940

(22) Filed: Sep. 21, 2006

Related U.S. Application Data (60) Provisional application No. 60/728,751, filed on Oct. 21, 2005.

(51) Int. Cl.
*H04B 10/00* (2006.01)

(52) U.S. Cl. .................. 398/206; 398/152; 398/204; 398/205; 398/208

(58) Field of Classification Search ............ 398/29, 398/205, 206, 208, 209, 211; 375/130–377
See application file for complete search history.

(56) References Cited

U.S. PATENT DOCUMENTS

| | | | |
|---|---|---|---|
| 4,506,388 A | | 3/1985 | Monerie et al. |
| 4,720,827 A | | 1/1988 | Kanaji |
| 4,723,316 A | | 2/1988 | Glance |
| 4,965,858 A | | 10/1990 | Naito et al. |
| 5,457,563 A | | 10/1995 | Van Deventer |
| 5,473,463 A | | 12/1995 | Van Deventer |
| 5,705,949 A | * | 1/1998 | Alelyunas et al. ........... 329/304 |
| 5,977,820 A | * | 11/1999 | Sogabe et al. ............... 329/306 |
| 5,995,512 A | | 11/1999 | Pogue et al. |
| 6,252,692 B1 | * | 6/2001 | Roberts ..................... 398/147 |
| 6,473,222 B2 | | 10/2002 | Hait et al. |
| 6,607,311 B1 | | 8/2003 | Fishman et al. |

(Continued)

FOREIGN PATENT DOCUMENTS

EP 1453239 A1 9/2004

(Continued)

OTHER PUBLICATIONS

Richard A. Linke, et al., "High-Capacity Coherent Lightwave Systems", Journal of Lightwave Technology, vol. 6, No. 11, Nov. 1988, pp. 1750-1769.

(Continued)

*Primary Examiner*—Ken N Vanderpuye
*Assistant Examiner*—Tanya Ngo
(74) *Attorney, Agent, or Firm*—Kent Daniels; Blake, Cassels & Graydon LLP (57) ABSTRACT

In a coherent optical receiver, a frequency domain engine digitally processes at least two multi-bit sample streams of a received optical signal. The frequency domain engine includes a Fast Fourier Transform (FFT) filter for computing a complex vector representative of a frequency-domain spectrum of the received optical signal. A transpose and add block computes a vector sum of the complex vector and a transposed version of the complex vector, and an Inverse Fast Fourier Transform (IFFT) filter computes a complex output vector from the addition result. With this arrangement, parallel real filter operations are efficiently performed on each of the multi-bit sample streams, using a single back-to-back FFT-IFFT filter structure.

31 Claims, 4 Drawing Sheets

U.S. PATENT DOCUMENTS

| | | | |
|---|---|---|---|
| 6,782,211 | B1 | 8/2004 | Core |
| 7,426,199 | B2 * | 9/2008 | Sondur et al. ............... 370/332 |
| 2002/0012152 | A1 | 1/2002 | Agazzi et al. |
| 2002/0042256 | A1 * | 4/2002 | Baldwin et al. .......... 455/232.1 |
| 2002/0123851 | A1 * | 9/2002 | Kurooka et al. ............... 702/69 |
| 2002/0186435 | A1 * | 12/2002 | Shpantzer et al. ........... 359/136 |
| 2003/0063285 | A1 | 4/2003 | Pering et al. |
| 2003/0123884 | A1 | 7/2003 | Willner et al. |
| 2003/0132375 | A1 * | 7/2003 | Blazo ...................... 250/252.1 |
| 2003/0175034 | A1 | 9/2003 | Noe |
| 2004/0114939 | A1 * | 6/2004 | Taylor ......................... 398/152 |
| 2004/0213146 | A1 * | 10/2004 | Jones et al. .................. 370/210 |
| 2005/0196176 | A1 * | 9/2005 | Sun et al. ..................... 398/152 |
| 2006/0013597 | A1 * | 1/2006 | Crivelli et al. .............. 398/208 |
| 2006/0140291 | A1 * | 6/2006 | Thomas, Jr. .................. 375/260 |
| 2006/0285854 | A1 * | 12/2006 | Sun et al. ..................... 398/155 |
| 2006/0285855 | A1 * | 12/2006 | Sun et al. ..................... 398/155 |
| 2007/0092260 | A1 * | 4/2007 | Bontu et al. ................. 398/152 |

FOREIGN PATENT DOCUMENTS

| | | |
|---|---|---|
| GB | 2214381 A | 8/1989 |
| WO | WO 00/60776 A1 | 10/2000 |
| WO | WO 02/27994 A1 | 4/2002 |

OTHER PUBLICATIONS

Chul-Ho Shin, et al., "Heterodyne Optical Phase-Locked Loop by Confocal Fabry-Perot Cavity Coupled AlGaAs Laser", IEEE Photonoics Technology Letters, vol. 2, No. 4, Apr. 1990, pp. 297-300.
D.-S. Ly-Gagnon, et al., "Coherent Detection of Optical Quadrature Phase-Shift Keying Signals with Carrier Phase Estimation", Journal of Lightwave Technology, vol. 24, No. 1, Jan. 2006, pp. 12-21.
Frowin Derr, "Coherent Optical QPSK Intradyne System: Concept and Digital Receiver Realization", Journal of Lightwave Technology, vol. 10, No. 9, Sep. 1992, pp. 1290-1296.
D.-S. Ly-Gagnon, et al., "Unrepeatered optical transmission of 20 Gbit/s quadrature phase-shift keying signals over 210 km using homodyne phase-diversity receiver and digital signal processing", Electronics Letters, vol. 41, No. 4, Feb. 17, 2005, pp. 1-2.
Y. Cai, et al., "On Performance of Coherent Phase-Shift-Keying Modulation in 40 Gb/s Long-Haul Optical Fiber Transmission Systems", OFC, Mar. 2006, pp. 1-3.
Matthias Seimetz, "Performance of Coherent Optical Square-16-QAM-Systems based on IQ-Transmitters and Homodyne Receivers with Digital Phase Estimation", OFC, Mar. 2006, pp. 1-10.
U. Koc, et al., Digital Coherent Quadature Phase-Shift-Keying (QPSK), OFC, Mar. 2006, pp. 1-3.
Satoshi Tsukamoto, et al., "Coherent Demodulation of Optical 8-Phase Shift-Keying Signals Using Homodyne Detection and Digital Signal Processing", OFC, Mar. 2006, pp. 1-3.
Kazuro Kikuchi, "Coherent Detection of Phase-Shift Keying Signals Using Digital Carrier-Phase Estimation", OFC, Mar. 2006, pp. 1-3.
B. Spinnler et al., "Chromatic Dispersion Tolerance of Coherent Optical Communications Systems With Electrical Equalization", OFC, Mar. 2006, pp. 1-3.
R.I. Killey, et al., "Electronic dispersion compensation by signal predistortion", OFC, Mar. 2006, pp. 1-3.
Satoshi Tsukamoto, et al., "Unrepeated 20-Gbit/s QPSK Tansmission over 200-km Standard Single-Mode Fiber Using Homodyne Detection and Digital Signal Processing for Dispersion Compensation", OFC, Mar. 2006, pp. 1-3.
S. Calabro, et al., "An electrical polarization-state controller and demultiplexer for polarization multiplexed optical signals", ECOC-IOOC, Sep. 2003, pp. 1-2.
Reinhold Noe, "Phase Noise-Tolerant Synchronous QPSK/BPSK Baseband-Type Intradyne Receiver Concept With Feedforward Carrier Recovery", Journal of Lightwave Technology, vol. 23, No. 2, Feb. 2005, pp. 802-808.
Reinhold Noe, "PLL-Free Synchronous QPSK Polarization Multiplex/Diversity Receiver Concept With Digital I&Q Baseband Processing", IEEE Photonics Technology Letters, vol. 17, No. 4, Apr. 2005, pp. 887-889.
Ezra Ip, et al., "Carrier Synchronization for 3-and 4-bit-per-Symbol Optical Transmission", Journal of Lightwave Technology, vol. 23, No. 12, Dec. 2005, pp. 4110-4124.
Yan Han, et al., "Coherent optical communication using polarization multiple-input-multiple-output", Optics Express, vol. 13, No. 19, Sep. 19, 2005, pp. 7527-7534.
L.E. Franks, "Carrier and Bit Synchronization in Data Communication-A Tutorial Review", IEEE Transactions on Communications, vol. COM-28, No. 8, Aug. 1980, pp. 1107-1121.
M. Cavallari, et al., "Electronic Signal Processing for Differential Phase Modulation Formats", OFC 2004, pp. 1-3.
A. Farbert, et al., "Performance of a 10.7 Gb/s Receiver with Digital Equaliser using Maximum Likelihood Sequence Estimation", ECOC 2004, Proceedings PD-Th4.1.5, Stockholm, pp. 1-2.
Yusuke Ota, et al., "High-Speed, Burst-Mode, Packet-Capable Optical Receiver and Instantaneous Clock Recovery for Optical Bus Opearation", Journal of Lightwave Technology, vol. 12, No. 2, Feb. 1994, pp. 325-331.
Isaac Shpantzer, Ph.D., "A New Generation of Coherent ULH Fiber-Optic Communication", CeLight Inc., 40 G Workshop, OECC-2002 Conference, Yokohama, Japan, Jul. 8, 2002, pp. 1-14.
Isaac Shpantzer, Ph.D. et al., "Coherent Optical Fiber Communication Architecture, Modeling and Optimization", CeLight Inc., SCEE 2002 Conference, Eindhoven, The Netherlands, Jun. 25, 2002, pp. 1-39.
M. Tseytlin et al., "Digital, endless polarization control for polarization multiplexed fiber-optic communications", CeLight Inc., OFC 2003, Mar. 24, 2003, pp. 1-14.
International Search Report for applicant's related International PCT Application PCT/CA2006/001458, Sep. 5, 2006.
International Search Report for applicant's related International PCT Application PCT/CA2006/001459, Sep. 5, 2006.
International Search Report for applicant's related International PCT Application PCT/CA2006/001460, Sep. 5, 2006.

* cited by examiner

HIGH-SPEED DIGITAL SIGNAL PROCESSING IN A COHERENT OPTICAL RECEIVER

CROSS-REFERENCE TO RELATED APPLICATIONS

This application claims benefit under 35 U.S.C. 119(e) from U.S. Provisional Patent Application Ser. No. 60/728,751, entitled Automatic Gain Control, which was filed on Oct. 21, 2005.

TECHNICAL FIELD

The present invention relates to optical communications networks, and in particular to high speed digital signal processing in a coherent optical receiver.

BACKGROUND OF THE INVENTION

In the optical communications space, receivers based on coherent detection techniques have suffered disadvantages that have, to date, prevented successful deployment in "real-world" installed communications networks.

For example, coherent optical receivers tend to be highly sensitive to optical impairments of the received carrier signal. Optical signals received through conventional optical links are typically distorted by significant amounts of chromatic dispersion (CD) and polarization dependent impairments such as Polarization Mode Dispersion (PMD), polarization angle changes and polarization dependent loss (PDL). Chromatic dispersion (CD) on the order of 30,000 ps/nm, and polarization rotation transients at rates of $10^5$ Hz are commonly encountered.

Coherent optical receivers also tend to be highly sensitive to frequency mismatch between the receiver's local oscillator (LO) and the carrier of the inbound optical signal. The transmitted carrier signal and the receiver's local oscillator (LO) signal are generated by respective transmitter and LO lasers, which, in the case of "real world" network systems, will be compact fiber or semi-conductor lasers which are subject to manufacturing and environmental variations. Such lasers are typically designed such that the average output frequency (over a period of 100 s of milliseconds or more) is stable at a value which is nominally fixed by the frequency setting. However, short period frequency excursions due to laser line width and phase noise are permitted. As a result, frequency variations of as much as ±400 MHz, at rates on the order of up to 50 KHz are commonly encountered. The resulting frequency mismatch $\Delta f$ between the LO signal and the received carrier signal appears as a phase error in recovered symbols, which can lead to erroneous data detection.

Various methods and systems intended to address some of these limitations are known in the art. For example, a method of compensating polarization angle impairments are described in *PLL-Free Synchronous QPSK Polarization Multiplex/Diversity Receiver Concept with Digital I&Q Baseband Processing*, R Noé, IEEE Photonics Technology Letters, Vol. 17, No. 4, April 2005. In the introduction of this same paper, Noé also alludes to the possibility of also compensating chromatic dispersion, but provides no further discussion as to how this might be done. A method of electronic carrier recovery is described in *Phase Noise-Tolerant Synchronous QPSK/BPSK Baseband-Type Intradyne Receiver Concept With Feedforward Carrier Recovery*, R Noé, Journal of Lightwave Technology, Vol. 23, No. 2, February 2005. The applicability of RF channel estimation techniques to the detection of polarization-division multiplexed optical signals in a quadrature coherent receiver is described by Y. Han et al. in *Coherent optical Communication Using Polarization Multiple-Input-Multiple-Output*, OPTICS EXPRESS Vol. 13, No. 19, pp 7527-7534, 19 Sep. 2005.

Frequency Locked Loop (FLL) and Phase Locked Loop (PLL) circuits for compensating the frequency mismatch $\Delta f$ are described in: *High Capacity Coherent Lightwave Systems*, Linke et al, Journal of Lightwave Technology, Vol. 6, No. 11, November 1988; *Heterodyne Phase Locked Loop by Confocal Fabry-Perot Cavity Coupled AlGaAs lasers*, Shin et al, IEEE Photonics Technology Letters, Vol. 2, No. 4, April 1990; and *Carrier Synchronization for 3 and 4-bit-per-Symbol Optical Transmission*, Ip et al, Journal of Lightwave Technology, Vol. 23, No. 12, December 2005. All of these systems operate to drive the receiver's LO to precisely track excursions of the received optical carrier. A limitation of this approach is that for optical communications systems with multi-gigabit line rates, a PLL/FLL loop bandwidth on the order of hundreds of MHz is needed to effectively compensate the laser phase noise. This is difficult to achieve at acceptable cost.

All of these systems depend on accurate recovery of a clock signal from the received optical signal. The two principle techniques used for this purpose are described by Noé (Supra, April 2005). These include an electronic clock recovery block inserted into the main data path between the photodetectors and the A/D converters, or alternatively an intensity modulation direct detection receiver which recovers a clock signal from light tapped from the input optical fiber. Both of these techniques are highly sensitive to Inter-Symbol-Interference due to chromatic dispersion, and Polarization Mode Dispersion (PMD).

A limitation that is common throughout the prior art is a lack of satisfactory bandwidth of the various compensation functions. For example, the FLL/PLL and carrier recovery techniques described above are intended to track (and thus compensate) laser phase noise. However, in order to provide sufficient accuracy of compensation, they lack sufficient bandwidth to acquire a signal across the entire possible range of impairment magnitude, such as a frequency error of several GigaHertz. As a result, these systems cannot reliably acquire a signal and stabilize to steady-state operation, even if they could track laser phase transients after a steady state had been achieved.

Similarly, the system of Noé (supra, April 2005) is designed to compensate polarization rotations, but it cannot track high speed transients of the type encountered in real-world communications networks. For example, Noé, claims that with a 10 GBaud signal, the inverse Jones matrix coefficients can be updated with a period of 16 μs. This is far too slow to successfully compensate 20 kHz polarization rotations, which have a period of 50 μs. In addition, the system of Noé tends to fail in the presence of severe Chromatic Dispersion (CD), at least in part due to failure of the clock recovery circuit as inter-symbol interference (ISI) increases, and consequent uncertainty of the sample timing of the A/D converters. While it is mathematically possible to design a filter function that compensates both polarization and chromatic dispersion (as alluded to by Noé), the prior art does not offer any methods by which satisfactory compensation accuracy can be obtained with an adaptation speed high enough to track real-world polarization transients. It follows that the system of Noé will not be able to reliably capture the instantaneous polarization state of the received signal during start-up, especially in the presence of high speed transients, and thus cannot guarantee that it will achieve a stable steady-state operation.

Prior art clock recovery systems suffer the same limitation, in that the PLL bandwidth required to obtain a satisfactory sample phase accuracy is significantly less than the possible range of clock and channel errors. As a result, conventional clock recovery circuits cannot reliably acquire a lock condition, even if they are able to maintain lock once it has been achieved. A further limitation of clock recovery circuits is that they are highly vulnerable to distortions in the received optical signal. While this can be overcome by compensating at least some of the distortions prior to the clock recovery circuit, such compensation normally requires the recovered clock signal in order to operate. As a result, the receiver cannot reliably acquire signal and achieve a steady state operation, even if such a state can be maintained once it has been achieved.

Accordingly, combining the above techniques leads to a coherent optical receiver that are capable of compensating: polarization angle variations, but only in the presence of low CD and PMD, and even then only when the polarization angle transients are relatively low speed; frequency mismatch Δf, but only within a frequency range that is too narrow to enable reliable signal acquisition; and dispersion, but only in the presence of low speed polarization transients. Vulnerability of the clock recovery systems to CD, PMD and polarization angle transients compound these limitations.

Applicant's co-pending U.S. patent application Ser. Nos. 11/294,613 filed Dec. 6, 2005 and entitled "Polarization Compensation In A Coherent Optical Receiver"; 11/315,342 filed Dec. 23, 2005 and entitled "Clock Recovery From An Optical Signal With Dispersion Impairments"; 11/315,345 filed Dec. 23, 2005 and entitled "Clock Recovery From An Optical Signal With Polarization Impairments"; 11/366,392 filed Mar. 2, 2006 and entitled "Carrier Recovery In A Coherent Optical Receiver"; and 11/423,822 filed Jun. 13, 2006 and entitled "Signal Acquisition In A Coherent Optical Receiver", the content of all of which are hereby incorporated herein by reference, describe methods and systems of reliable signal acquisition, clock recovery and polarization compensation in the presence of moderate- to severe optical impairments of a received optical signal. A feature of all of these systems is that a multi-bit "raw" sample stream of the received optical signal is digitally processed to at least partially compensate dispersion, before any of the clock recovery, polarization compensation, or carrier recovery methods are implemented. Since the raw sample stream cannot be inverse multiplexed into parallel substreams without loss of information, this digital processing must be performed at the full sample rate of the data path. In embodiments where Nyquist sampling of the input optical signal is used, this sample rate will be about double the highest expected symbol rate of the optical signal. Nominal symbol rates of 10 Gbaud or higher are anticipated.

Additionally, it is desirable to process the "raw" sample stream to facilitate clock recovery and frame detection functions in the presence of significant amounts or residual dispersion. It is also desirable to process the "raw" sample stream to produce a dispersion compensated sample stream, which retains a proper phase alignment between samples, so as to preserve the original phase information of the received optical signal needed to support downstream polarization compensation and carrier recovery functions. It is further desirable to implement all of the above digital signal processing within an efficient package so as to minimize Integrated Circuit (IC) area and heat generation during operation.

SUMMARY OF THE INVENTION

An object of the present invention is to provide methods and techniques enabling efficient high speed digital signal processing in a coherent optical receiver.

Thus, an aspect of the present invention provides a frequency domain engine for digitally processing at least two multi-bit sample streams of a received optical signal. The frequency domain engine includes a Fast Fourier Transform (FFT) filter for computing a complex vector representative of a frequency-domain spectrum of the received optical signal. A transpose and add block computes a vector sum of the complex vector and a transposed version of the complex vector, and an Inverse Fast Fourier Transform (IFFT) filter computes a complex output vector from the addition result. With this arrangement, parallel real filter operations are efficiently performed on each of the multi-bit sample streams, using a single back-to-back FFT-IFFT filter structure.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF PREFERRED EMBODIMENTS

The present invention provides methods and techniques that enable efficient high speed digital signal processing in a coherent receiver of an optical communications network. Embodiments of the present invention are described below, by way of example only, with reference to FIGS. 1-4.

In general, the present invention provides a high-speed digital signal processor (DSP) for analysing the "raw" multi-bit sample streams output by the photodetector(s) of a coherent optical receiver. In some embodiments, support for dispersion compensation, signal acquisition, burst framing and clock recovery functions may also be provided. Preferably, the digital signal analysis is performed in the frequency domain, in which case the high-speed digital signal processor (DSP) may conveniently be referred to as a Frequency Domain Engine (FDE).

Figure 1:
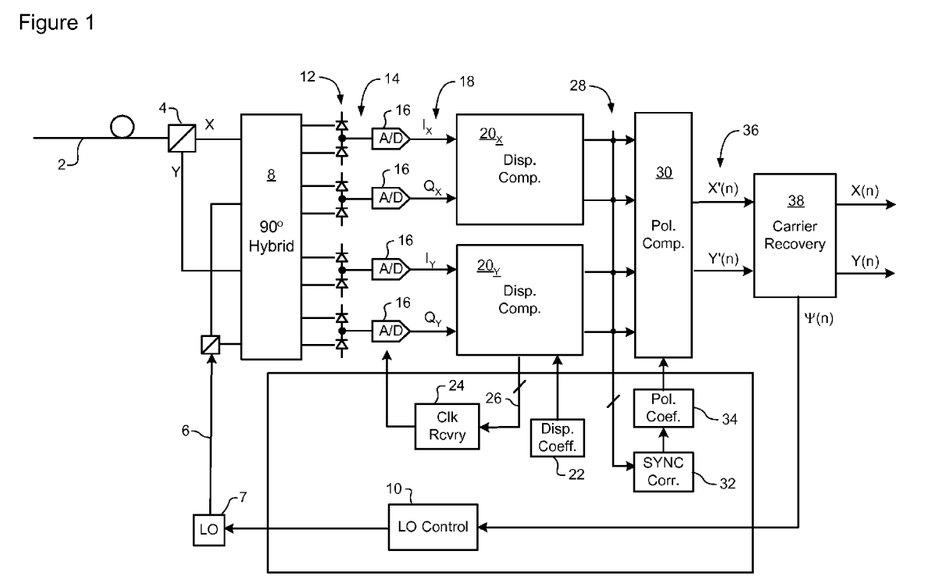
FIG. 1 is a block diagram schematically illustrating principal elements and operations of a coherent optical receiver in which methods in accordance with the present invention may be implemented.

FIG. 1 schematically illustrates a representative coherent optical receiver in which methods of the present invention may be implemented. In the coherent optical receiver of FIG. 1, an inbound optical signal is received through an optical link 2, split into orthogonal polarizations by a Polarization Beam Splitter 4, and then mixed with a Local Oscillator (LO) signal 6 by a conventional 90° optical hybrid 8. An LO controller 10 is provided to control the frequency of the LO 6 to minimize a frequency mismatch Δf between the LO and the carrier of the inbound optical signal. The composite optical signals emerging from the optical hybrid 8 are supplied to respective photodetectors 12, which generate corresponding analog signals 14. The photodetector signals 14 are sampled by respective Analog-to-Digital (A/D) converters to yield raw multi-bit digital sample streams 18 corresponding to In-phase (I) and Quadrature (Q) components of each of the received polarizations. Although two photodetectors 12 are shown for each A/D 16 in FIG. 1, in some embodiments only one photodetector can be used for each A/D with satisfactory performance.

As may be appreciated, the resolution of the A/D converters 16 is a balance between performance and cost. Increasing the resolution improves sampling accuracy, and thereby improves the extent to which signal distortions can be corrected by downstream dispersion and polarization compensators. However, this increased accuracy is obtained at a cost of increased complexity, silicon area and heat generation. It has been found that a resolution of n=5 or 6 bits provides satisfactory performance, at an acceptable cost. Preferably, the sample rate of the A/D converters 16 is selected to satisfy the Nyquist criterion for the highest anticipated symbol rate of the received optical signal. As will be appreciated, Nyquist sampling ensures that the raw sample streams 18 generated at the A/D converter output contains all of the information content of each photodetector signal 14, even if the sample timing (with reference to each received symbol) is ambiguous and/or unknown. In some embodiments, the symbol rate of the received optical signal is 10 GHz, in which case a sample rate of the A/D converters 16, and thus the raw sample streams 18, will be 20 GHz. From the A/D converter 16 block, the n-bit I and Q sample streams 18 of each received polarization are supplied to a respective Dispersion compensator 20, which operates on the sample stream(s) 18 to at least partially compensate chromatic dispersion of the received optical signal. As may be appreciated, a dispersion compensation block 20 can be linear or nonlinear, or some combination of both. The methods described in the present application provide a particularly efficient linear implementation when used in a coherent optical receiver.

A dispersion training loop 22 for calculating the dispersion compensation coefficients (and thereby training the dispersion compensator 20) can be implemented using a variety of methods, such as those described in Applicant's co-pending U.S. patent application Ser. No. 11/423,822 filed Jun. 13, 2006.

A clock recovery block 24 may tap the dispersion compensators 20 to obtain an at least partially dispersion compensated sample stream 26, which is then used for recovering a clock signal, as described in Applicant's co-pending U.S. patent application Ser. Nos. 11/315,342 and 11/315,345, both of which were filed Dec. 23, 2005.

The dispersion-compensated sample streams 28 appearing at the output of the dispersion compensators 20 are then supplied to a polarization compensator 30 which operates to de-convolve the transmitted I and Q signal components of each transmitted polarization from the dispersion-compensated sample streams 28. Various methods may be used to implement the polarization compensator 30, such as, for example, a Finite Impulse Response (FIR) filter. A polarization training loop including a SYNC detector 32 and a coefficient calculator compute updated filter coefficients which are then downloaded to the polarization compensator 30 to track and compensate polarization impairments.

The distortion-compensated sample streams 36 appearing at the output of the polarization compensator 30 are then supplied to a carrier recovery block 38 for compensating residual frequency mismatch Δf between the LO and the carrier of the received optical signal, as well as symbol detection (for data recovery).

Figure 2A:
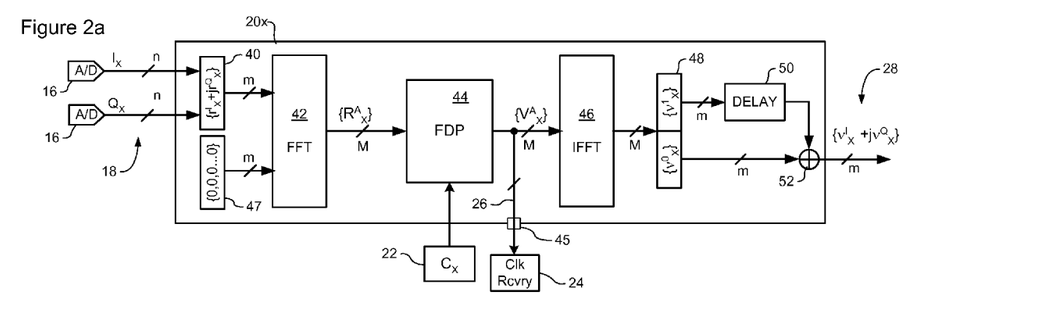
FIGS. 2a-2c are block diagrams schematically illustrating principal elements and operations of a Digital Signal Processor usable in the coherent optical receiver of FIG. 1.
Figure 2B:
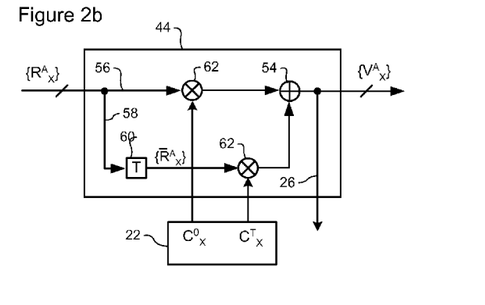
Figure 2C:
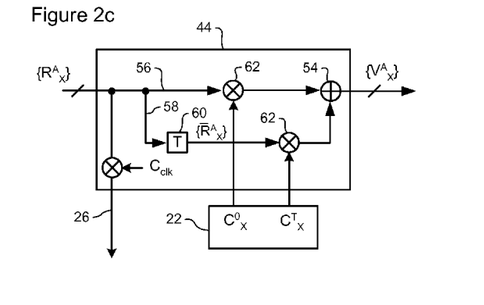

In accordance with the present invention, each dispersion compensator 20 is provided as a high speed digital signal processor (DSP) which is capable of implementing a variety of processing functions. In the illustrated embodiments, two substantially identical DSPs 20 are provided, each of which is connected to receive and process raw In-phase and Quadrature sample streams 18 of a respective received polarization. FIGS. 2*a-c* are block diagrams illustrating a representative DSP 20 in greater detail.

In the embodiment of FIG. 2*a* the DSP 20 generally comprises a pipelined series of functional blocks, including a deserializer 40, a Fast Fourier Transform (FFT) filter 42, a frequency domain processor (FDP) 44 and an Inverse Fast Fourier Transform (IFFT) filter 46.

The deserializer 40 operates to accumulate successive n-bit samples of the (serial) In-phase and Quadrature sample streams $I_X$ and $Q_X$ from the A/D converters 16 during a predetermined clock period. The accumulated n-bit samples are then latched into the FFT 42 as a parallel input vector $\{r^I_X + jr^Q_X\}$. Preferably, each of the real and imaginary components of the parallel vector $\{r^I_X + jr^Q_X\}$ have the same resolution (n=5 or 6 bits, for example) as the sample streams 18 $I_X$ and $Q_X$ generated by the A/D converters 16. In general, the width (m), in samples, of the input vector $\{r^I_X + jr^Q_X\}$ is selected to be half the width (M) of the FFT 18$_X$. In some embodiments, the FFT 42 has a width of M=256 taps, which implies an input vector width of m=128 complex values. However, a different FFT width may be selected, as desired. In practice, the FFT width is selected based on a compromise between circuit size and the amount of dispersion compensation desired. An FFT width of M=256 taps enables efficient compensation of over 10,000 ps/nm of chromatic dispersion.

An advantage of this arrangement is that all of the components downstream of the deseriallizer 42 operate on a plurality of I,Q samples in parallel. As a result, these components of the DSP 20 can operate at a significantly lower speed than the full line rate of the data path. For example, Nyquist sampling of a 10 GBaud optical signal will result in the A/D converters 16 outputting each of the raw I and Q sample streams 18 at a sample rate of 20 GHz. However, because the deserializer 40 converts this serial stream of n-bit samples in to blocks of m (=128, for example) parallel samples, the FFT filter 42, FDP 44 and IFFT filter 46 can all operate at a much slower speed, by a factor of m.

The input vector $\{r^I_X + jr^Q_X\}$ is augmented with a null vector $\{0, 0, 0, \ldots 0\}$ 47 which provides a zero data fill to the remaining input taps of the FFT 42.

The FFT filter 42 performs a conventional FFT operation to generate an array $\{R^A_X\}$ representing the frequency domain spectrum of the input vector $\{r^I_X + jr^Q_X\}$. The FDP 44 can then implement any of a variety of frequency domain processing functions, as will be described in greater detail below, to yield a modified array $\{V^A_X\}$, which is supplied to the IFFT filter 46.

The IFFT filter 46 performs a conventional Inverse Fast Fourier Transform operation to yield time domain data 48, in the form of a complex valued vector having a width equal to the IFFT, which, in the illustrated embodiment is M taps. In the embodiment of FIG. 2, the IFFT output data 48 is divided into two blocks $\{v^0{}_X\}$, and $\{v^1{}_X\}$, of which $\{v^1{}_X\}$ is delayed by one clock cycle (at 50) and added to $\{v^0{}_X\}$ (at 52) to yield the DSP output 28 in the form of a complex valued vector $\{v^I{}_X + jv^Q{}_X\}$.

As is known in the art, conventional FFT and IFFT filters normally implement complex filter functions, which assume that the input I and Q data can properly be treated as real and imaginary components of a single complex valued entity. However, in the optical receiver of FIG. 1, the raw I and Q sample streams 18 generated by the A/D converters 16 contain significant polarization impairments. As a result, the input vector $\{r^I{}_X + jr^Q{}_X\}$ contains information of both transmitted polarizations, which will only be deconvolved downstream of the DSP 20. It is therefore necessary to ensure that polarization information embedded in the I and Q sample streams 18 is accurately preserved in the DSP output 28.

In real-world network systems, design limitations and manufacturing variations in the optical hybrid 8 prevents perfect phase alignment between the I and Q optical signals supplied to the photodetectors 14. Within the photodetectors and A/D converters 16, differing propagation delays, amplitude and phase responses are present, as a function of the manufacturing variations and operating temperature. The result of all of these effects is that the I and Q sample streams 18 of any given polarization contain an amount of quadrature error, and it is desirable to compensate this error within DSP 20 so that it does not propagate to downstream processing blocks. In general, this requires the DSP 20 to implement respective parallel real FFT filter functions for each sample stream 18, rather than a single complex FFT encompassing both I and Q streams. Similarly, respective parallel real IFFT filter functions are required, rather than a signal complex IFFT. A "brute force" solution to this problem is to implement respective parallel real FFT and IFFT filters for each of the I and Q sample streams. However, this arrangement suffers a disadvantage in that it significantly increases IC area, and thus heat generation and cost of the DSP 20.

A preferred solution is to implement a transpose-and-add function within the FDP 44, as may be seen in FIG. 2b. In general, the transpose-and-add function operates to add the FFT output vector $\{R^A{}_X\}$ to a transposed version of itself $\{\overline{R}_X{}^A\}$, with respective different compensation vectors. Implementing the transpose and add operation between the complex FFT and IFFT filters has the effect of emulating a pair of parallel real-FFT and IFFT functions through the DSP 20, without requiring the additional of circuits needed for parallel real FFT and IFFT filters. The transpose-and-add function can be conveniently implemented in hardware, by providing a pair of parallel paths between the FFT output and a vector addition block 54. One of these paths may be referred to as a direct path 56, in which the tap-order of the FFT output $\{R^A{}_X\}$ is retained. The other path, which may be referred to as a transpose path 58, includes a transposition block 60 which operates to reverse the tap-order of the FFT output upstream of the vector addition block 54. In this respect, it will be recognised that the transposition block 60 can be readily implemented in hardware, which provides an advantage in that the transposition step does not incur a significant propagation delay penalty.

Preferably, the direct and transpose paths 56 and 58 are provided with a respective multiplication block 62, which enables various filter functions to be implemented by the FDP 44. For example, in the embodiment of FIG. 2b, a pair of compensation vectors $\{C^O{}_X\}$ and $\{C^T{}_X\}$ are applied to the direct and transpose paths, 56 and 58 respectively. Each of the compensation vectors $\{C^O{}_X\}$ and $\{C^T{}_X\}$ is composed of a respective set of coefficients which are calculated to apply a desired function, in the frequency-domain, to the sample streams 18. For example, $\{C^O{}_X\}$ and $\{C^T{}_X\}$ may be calculated using a transform of a differential delay function, so as to compensate quadrature error. $\{C^O{}_X\}$ and $\{C^T{}_X\}$ may also apply a first-order dispersive function to at least partially compensate chromatic dispersion. When both of these functions are implemented by the compensation vectors $\{C^O{}_X\}$ and $\{C^T{}_X\}$, the DSP output 28 will represent a quadrature-error corrected and dispersion-compensated version of the raw $I_X$ and $Q_X$ sample streams 18 received from the A/D converters 16.

As may be appreciated, the differential time delay needed to compensate quadrature error may be calculated based on the results of factory calibration tests during manufacture of the receiver, and/or during System Layout and Test (SLAT). Once this information is known, known methods may be used to derive compensation vector coefficients that will impose the required differential delay and thereby compensate the quadrature error. Compensation vector coefficients that will compensate dispersion can be obtained by any of a variety of known methods, such as, for example, those in Applicant's co-pending U.S. patent application Ser. No. 11/423,822 filed Jun. 13, 2006.

In some embodiments, at least a portion of the modified array $\{V^A{}_X\}$ generated by the FDP 44 is tapped and output from the DSP 20 through an FDP port 45. If desired, a copy of the entire modified array $\{V^A{}_X\}$ can be supplied through the FDP port 45. However, in preferred embodiments, only the vector components encompassing the Upper Side Band (USB) and Lower Side Band (LSB) are tapped and output through the FDP port 45. As described in Applicant's co-pending U.S. patent application Ser. Nos. 11/315,342 and 11/315,345, both filed Dec. 23, 2005, the USB and LSB signals provide sufficient information for clock recovery, even in the presence of significant residual dispersion and moderate to sever polarization impairments. As a result, the DSP 20 is capable of supporting signal acquisition and clock recovery, for example during a start-up phase of operation of the receiver, even when total dispersion of the optical link may not be accurately known.

As will be appreciated, in the embodiment of FIG. 2b, the tapped signals 26 output through the FDP port 45 are tapped from the modified array $\{V^A{}_X\}$, and thus include the results of the transpose and add function, as well as application of the compensation vectors $\{C^O{}_X\}$ and $\{C^T{}_X\}$. In many cases, will be preferred because the tapped signals 26 will then be at least partially dispersion compensated. This is particularly beneficial for simplifying clock recovery in the present of moderate to severe optical signal impairments. However, other methods may equally be used, if desired.

For example, in the embodiment of FIG. 2c, the tapped signals 26 are obtained at the "front end" of the FDP 44, and so encompass some (or all) of the components of the FFT output $\{R^A{}_X\}$. A desired operator $C_{clk}$ (may then be applied to the tapped signals 26, for example using multiplier 63. This arrangement may be suitable where it is desirable to apply a dispersive function to the tapped signals 26, independently of that implemented by the compensation vectors $\{C^O{}_X\}$ and $\{C^T{}_X\}$. The operator $C_{clk}$ (may also (or alternatively) be used to implement a digital filter function, for example to isolate a desired side-band, again, independently of the compensation vectors $\{C^O{}_X\}$ and $\{C^1{}_X\}$.

Those of ordinary skill in the art will recognise that an operator may also be applied to the tapped signals 26 in the embodiment of FIG. 2b, in a directly analogous manner. However, in such a case, the resulting tapped signals 26 would include the effects of all of the transpose and add, compensation vectors $\{C^O{}_X\}$ and $\{C^T{}_X\}$ and the operator $C_{clk}$. A useful implementation of this latter arrangement is to select the operator $C_{clk}$ (to implement a band-pass function which isolates the desired upper side band (USB) and lower side band (LSB) signals. As a result, USB and LSB selection is programmable, and thus can be adapted to optimize the clock recovery operation.

The IFFT 46 performs a conventional Inverse Fourier Transform operation to yield multi-bit time domain data 48. As will be appreciated, this data will be represented as a complex valued vector having a width equal to the IFFT 46, which, in the illustrated embodiment is M=256 taps. As may be seen in FIG. 2, the IFFT 46 output data 48 is divided into two blocks $\{v^0{}_X\}$, and $\{v^1{}_X\}$, of which $\{v^1{}_X\}$ is delayed by one clock cycle (at 50) and added to $\{v^0{}_X\}$ (at 52) to yield an output vector $\{v^I{}_X+jv^Q{}_X\}$ of the DSP 20.

It should be noted that, like the FFT 42, the IFFT 46 performs a conventional complex filter operation, and thus both the IFFT output data and DSP output vector $\{v^I{}_X+jv^Q{}_X\}$ will also be a complex valued entity. However, because of the transpose-and-add function implemented by the FDP 44, the real and imaginary components $\{v^I{}_X\}$ and $\{v^Q{}_X\}$ of the DSP output vector $\{v^I{}_X+jv^Q{}_X\}$ will be valid quadrature corrected and dispersion compensated versions of the original "raw" sample streams $I_X$ and $Q_X$ 18 received from the A/D converters 16, and all of the original polarization information will be preserved.

Figure 3:
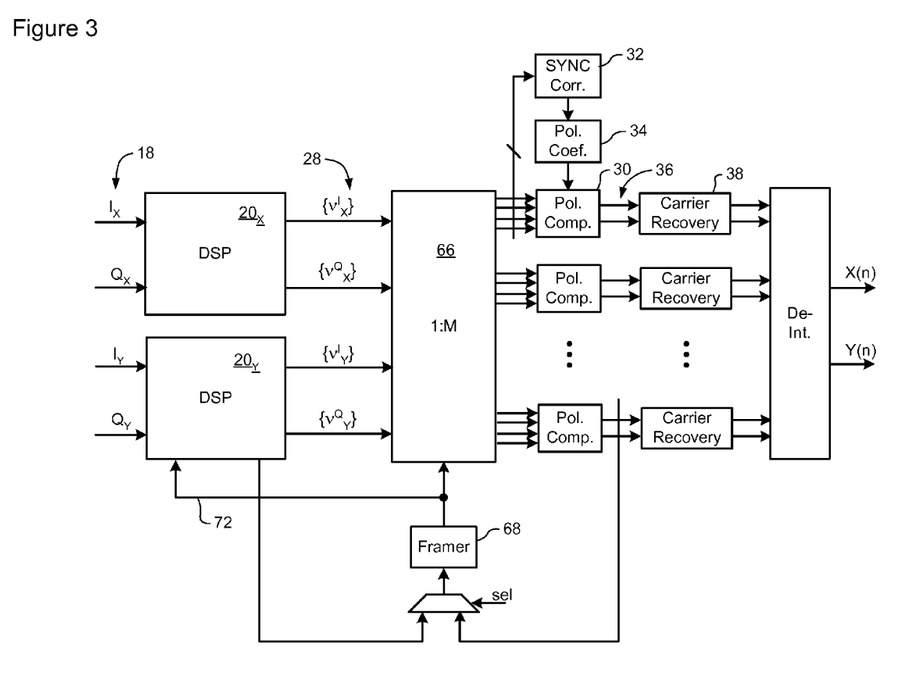
FIG. 3 is a block diagram schematically illustrating principal elements and operations of an alternative coherent optical receiver in which methods in accordance with the present invention may be implemented.

In the embodiment of FIG. 1, the coherent optical receiver includes a single data path extending between the photodetectors 12 and the carrier recovery block 38, As a result all of the signal processing blocks forming the data path must operate at the full line rate. In some cases, it will be desirable to provide multiple parallel data paths, each of which operates at a correspondingly lower speed. FIG. 3 illustrates an embodiment in which the dispersion-compensated sample streams 28 appearing at the output of the DSPs 20 are supplied to a 1:M distribution unit 66, which operates to divide the signal path, by selectively routing blocks of samples from the DSPs 20 into each one of M paths. Within each path, a respective polarization compensator 30 operates to de-convolve the transmitted I and Q signal components of each polarization from the dispersion-compensated sample streams 28. The distortion-compensated sample streams 36 appearing at the output of each polarization compensator 30 are then supplied to a respective carrier recovery block 38 for detection of data symbols and recovery of data.

In the illustrated embodiment, the distribution unit 66 is implemented as a "burst switch" controlled by a framer 68, to generate overlapping blocks of samples. One implementation of a burst switch may, for example, include a multi-port Random Access Memory (RAM), which allows samples to be simultaneously supplied to two or more data paths. This arrangement offers the advantage that each sample block contains sufficient information to enable polarization compensation and data decoding substantially independently of any other data path.

Preferably, the framer 66 operates to detect the timing of SYNC bursts composed of a known SYNC symbol sequence embedded within the received optical signal. Representative SYNC symbol sequences of the type which may be used for this purpose are described in Applicant's co-pending U.S. patent application Ser. No. 11/328,199 filed Jan. 10, 2006, the contents of which are hereby incorporated herein by reference. In some embodiments, the SYNC sequence may be repeated at a frequency of about 1000 times lower than the symbol rate of the optical communications signal. Thus, for an optical communications system in which the symbol rate is 10 GHz, the SYNC repetition frequency will be about 10 MHz.

The framer 68 may use any suitable technique to detect the timing of each SYNC burst within the dispersion compensated sample stream(s) 28. As may be appreciated, during signal acquisition, it is not necessary for this operation to be perfect. In fact, it is sufficient that the framer 68 control the distribution unit 66 with sufficient accuracy that each sample block supplied to each data path contains an intact SYNC burst. When this condition is satisfied, the SYNC detector 32 and coefficient calculator 34 can successfully operate to provide compensation of the polarization impairments. Once the polarization compensators have stabilized, the framer 68 may use the polarization compensated sample streams to accurately determine the SYNC burst timing.

Figure 4:
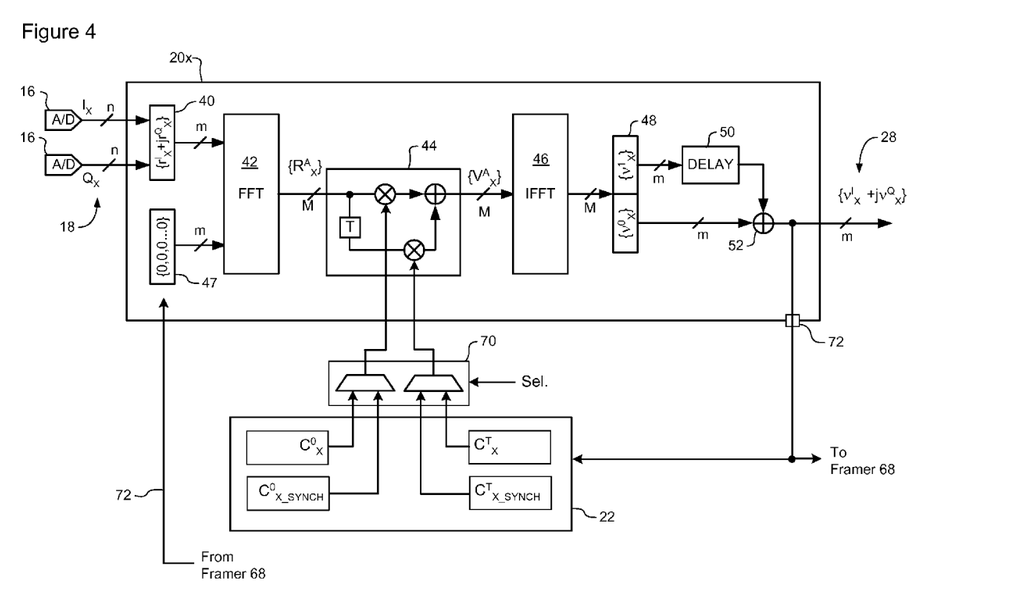
FIG. 4 is a block diagram schematically illustrating principal elements and operations of a Digital Signal Processor usable in the coherent optical receiver of FIG. 3.

FIG. 4 illustrates an embodiment in which the DSPs 20 can be used to facilitate detection of SYNC burst timing by the framer 68, for example during signal acquisition, and then subsequently switch to dispersion (and quadrature error) compensation for steady state operation of the receiver. In the embodiment of FIG. 4, the coefficient calculator 22 is provided with a selector 70 for selecting a desired pair of compensation vectors which are supplied to the FDP 44. One of these vector pairs $\{C^O{}_X, C^T{}_X\}$ is composed of compensation coefficients which are calculated to compensate chromatic dispersion of the optical link (and quadrature error), as discussed above with reference to FIGS. 1 and 2, and can therefore be selected for use during steady-state operation of the receiver. A second vector pair $\{C^O{}_{X\_SYNC}, C^T{}_{X\_SYNC}\}$ is composed of compensation coefficients which are calculated using a transform of the known SYNC symbol sequence either alone or in combination with a dispersion compensation function and, if desired, quadrature error correction.

During a signal acquisition mode of operation of the receiver, for example during system start-up, the selector 70 is controlled to supply the burst framing vector pair $\{C^O{}_{X\_SYNC}, C^T{}_{X\_SYNC}\}$ to the FDP 44. As a result, the DSP output vector components $\{v^I{}_X\}$ and $\{v^Q{}_X\}$ will contain the cross-correlation between the raw sample streams $I_X$ and $Q_X$ 18 and the known SYNC symbol sequence. Accordingly, at least a portion of the DSP output vector can be tapped and supplied to the framer 68, for example via a DSP port 72. This enables the framer 68 to estimate the SYNC burst timing within the received optical signal, at least with a sufficient degree of accuracy for signal acquisition purposes.

As described in Applicant's co-pending U.S. patent application Ser. No. 11/423,822 filed Jun. 13, 2006, the cross-correlation between the raw sample streams $I_X$ and $Q_X$ 18 and the known SYNC symbol sequence can be used to provide a direct indication of residual dispersion. Accordingly, supplying the tapped portion of the DSP output vector to the coefficient calculator 22, as shown in FIG. 4, also enables optimization of the dispersion compensation vector coefficients.

Once the framer 68 has determined the SYNC burst timing, the distribution block 66 can be controlled to accumulate dispersion compensated sample streams 28 output from the DSPs 20 into sample blocks, and then forward each successive sample block to a respective data path for polarization compensation, carrier recovery and data detection. Once the polarization compensators 30 have stabilized, the polarization compensated sample streams 36 can be selected and used by the framer 68 to accurately determine the SYNC burst timing for steady state operation. Once this occurs, the dispersion compensation vector pair $\{C^O{}_X, C^T{}_X\}$ can be selected and supplied to the FDP 44 to provide dispersion compensation for continuing steady state operation of the DSPs 20.

In some embodiments, optimization of the distribution block 66 can be obtained by arranging that the SYNC burst occupies a predetermined location within the DSP output vector. For example, it may be desirable to arrange that the SYNC burst occupies the first N symbols of the DSP output vector, where, in this example, N is the length of the SYNC burst. This can be accomplished by implementing the deserializer 40 as a barrel shifter controlled by a control signal 72 from the framer 68. This enables the location of the SYNC burst within the input vector $\{r^I_X + jr^Q_X\}$, and thus also the DSP output vector $\{v^I_X + jv^Q_X\}$, to be adjusted by the framer 68. One way of accomplishing this is to compute the coefficients of the burst framing vector pair $\{C^O_{X\_SYNC}, C^T_{X\_SYNC}\}$ using the known SYNC symbols located in the first N symbols of the input vector. The framer 68 can then control the barrel shifter 40 to progressively scroll the input samples 18 through the FDE input vector $\{r^I_X + jr^Q_X\}$ until a local maximum of the cross-correlation is found. This approach has an advantage that it enables reasonably accurate estimation of the SYNC burst timing, while at the same time placing the SYNC burst at the desired location within the DSP output vector $\{v^I_X + jv^Q_X\}$ for optimum operation of the distribution block 66.

If desired, a directly analogous approach may be used to detect one or more other signals (such as a pilot channel, for example) within the received optical signal. For example, if a known symbol sequence (or signature) is transmitted through a pilot channel, it is possible to detect the transmitted symbol pattern (and thus the pilot channel) by computing coefficients of a vector pair $\{C^O_{X\_PCH}, C^T_{X\_PCH}\}$ using a transform of the signature symbol sequence. The DSP output vector components $\{v^I_X\}$ and $\{v^Q_X\}$ will then contain the cross-correlation between the raw sample streams $I_X$ and $Q_X$ 18 and the known signature sequence, which enables detection of the pilot channel by monitoring $\{v^I_X\}$ and $\{v^Q_X\}$.

As may be appreciated, there are various ways in which selection of the desired compensation vector pairs may be implemented. For example, coefficients of each vector may be precomputed and saved in a respective page of Random Access Memory (RAM). With this arrangement, selection of a desired compensation vector during run-time is a simple matter of selecting the appropriate RAM page. Other techniques, which will be apparent to those of ordinary skill in the art, may also be used.

The embodiments of the invention described above are intended to be illustrative only. The scope of the invention is therefore intended to be limited solely by the scope of the appended claims.

We claim:

1. In a coherent optical receiver, a high speed digital signal processor (DSP) for digitally processing at least two multi-bit sample streams of a received optical signal, the digital signal processor comprising:
    a Fast Fourier Transform (FFT) filter for processing the at least two multi-bit sample streams to compute an array $\{R^A_X\}$ representative of a spectrum of the received optical signal;
    a frequency domain processor for applying a selected frequency domain function to the FFT output array $\{R^A_X\}$ to derive a modified array $\{V^A_X\}$, the frequency domain processor comprising:
        a multiplier for multiplying the FFT output array $\{R^A_X\}$ by a respective coefficient vector implementing at least a portion of the frequency domain function; and
        a transpose-and-add block for emulating parallel real FFT-IFFT filters; and
    an Inverse Fast Fourier Transform (IFFT) filter for deriving a time domain output vector based on the modified array $\{V^A_X\}$;
    wherein the frequency domain function is selected to support any two or more of: clock recovery, dispersion compensation, quadrature error correction and signal framing; and
    wherein the transpose-and-add block comprises:
        a vector addition block;
        a direct path for supplying the FFT output array $\{R^A_X\}$ to the vector addition block; and
        a transpose path for supplying a transpose array $\{\overline{R}^A_X\}$ to the vector addition block;
        wherein the multiplier comprises a respective vector multiplier disposed in each path, for applying a respective coefficient vector to each array.

2. A digital signal processor as claimed in claim 1, wherein, in a signal acquisition mode of operation of the coherent optical receiver, the frequency domain function is selected to support any two or more of: clock recovery, dispersion compensation, quadrature error correction and signal framing.

3. A digital signal processor as claimed in claim 1, wherein, in a steady state mode of operation of the coherent optical receiver, the frequency domain function is selected to support either one or both of clock recovery and dispersion compensation.

4. A digital signal processor as claimed in claim 1, wherein the FFT filter, Frequency Domain Processor and IFFT filter are pipelined.

5. A digital signal processor as claimed in claim 1, wherein the at least two multi-bit sample streams comprise respective In-Phase and Quadrature sample streams of a received polarization of the optical signal.

6. A digital signal processor as claimed in claim 5, wherein each of the multi-bit sample streams has a resolution of at least 5 bits and a sample rate of at least 20 GHz.

7. A digital signal processor as claimed in claim 1, further comprising an FDP port for outputting at least a portion of the modified array $\{V^A_X\}$.

8. A digital signal processor as claimed in claim 1, further comprising a DSP port for outputting at least a portion of the complex output array independent of a main data path of the DSP.

9. In a coherent optical receiver, a method of processing at least two multi-bit sample streams of a received optical signal, the method comprising steps of:
    processing the at least two multi-bit sample streams to compute an array $\{R^A_X\}$ representative of a spectrum of the received optical signal;
    applying a selected frequency domain function to the array $\{R^A_X\}$ to derive a modified array $\{V^A_X\}$, wherein the step of applying the frequency domain function to the array $\{R^A_X\}$ further comprises steps of:
        multiplying the array $\{R^A_X\}$ and a transpose array $\{\overline{R}^A_X\}$ by a respective coefficient vector implementing at least a portion of the frequency domain function; and
        adding the multiplication results;
    deriving a time-domain output vector based on the modified array $\{V^A_X\}$; and
    wherein the frequency domain function is selected to support any two or more of: clock recovery, dispersion compensation, quadrature error correction and signal framing.

10. A method as claimed in claim 9, wherein, in a signal acquisition mode of operation of the coherent optical receiver, the frequency domain function is selected to support any two or more of: clock recovery, dispersion compensation, quadrature error correction and signal framing.

11. A method as claimed in claim 9, wherein, in a steady state mode of operation of the coherent optical receiver, the frequency domain function is selected to support either one or both of clock recovery and dispersion compensation.

12. A method as claimed in claim 9, wherein the steps of computing the array $\{R^A{}_{X'}\}$, applying the selected frequency domain function FFT filter, and deriving the time-domain output vector are pipelined.

13. A method as claimed in claim 9, wherein the at least two multi-bit sample streams comprise respective In-Phase and Quadrature sample streams of a received polarization of the optical signal.

14. A method as claimed in claim 13, wherein each of the multi-bit sample streams has a resolution of at least 5 bits and a sample rate of at least 20 GHz.

15. A method as claimed in claim 9, wherein the step of computing an array $\{R^A{}_{X'}\}$ comprises a step of performing a Fast Fourier Transform (FFT).

16. A method as claimed in claim 9, further comprising a step of outputting at least a portion of the modified array $\{V^A{}_{X'}\}$.

17. A method as claimed in claim 9, further comprising a step of outputting at least a portion of the complex output array independently of a main data path of the DSP.

18. In a coherent optical receiver, a high speed digital signal processor (DSP) for digitally processing at least two multi-bit sample streams of a received optical signal, the digital signal processor comprising:
  a Fast Fourier Transform (FFT) filter for processing the at least two multi-bit sample streams to compute an array $\{R^A{}_{X'}\}$ representative of a spectrum of the received optical signal;
  a frequency domain processor for applying a selected frequency domain function to the FFT output array $\{R^A{}_{X'}\}$ to derive a modified array $\{V^A{}_{X'}\}$;
  an Inverse Fast Fourier Transform (IFFT) filter for deriving a time domain output vector based on the modified array $\{V^A{}_{X'}\}$;
  a selector responsive to a select signal, for supplying a selected one of a set of two or more predetermined coefficient vectors to the frequency domain processor, wherein the set of two or more predetermined coefficient vectors comprises:
    a first coefficient vector containing coefficients calculated to at least partially compensate dispersion of the received optical signal; and
    a second coefficient vector containing coefficients calculated using a transform of a predetermined symbol sequence embedded in the optical signal, such that the complex output vector contains a cross-correlation of the sample streams and the predetermined sequence of symbols.

19. A digital signal processor as claimed in claim 18, further comprising an FDP port for outputting at least a portion of the modified array $\{V^A{}_{X'}\}$.

20. A digital signal processor as claimed in claim 18, further comprising a DSP port for outputting at least a portion of the complex output array independent of a main data path of the DSP.

21. A digital signal processor as claimed in claim 18, wherein at least one coefficient vector contains coefficients calculated to correct quadrature error of the multi-bit sample streams.

22. A digital signal processor as claimed in claim 18, wherein the predetermined symbol sequence is a SYNC burst embedded in the optical signal.

23. A digital signal processor as claimed in claim 22, further comprising a barrel-shifter for adjusting a position of the SYNC burst within the complex output vector, based on a detected timing of the SYNC burst.

24. A digital signal processor as claimed in claim 18, wherein the predetermined symbol sequence is a pilot channel signature embedded in the optical signal.

25. In a coherent optical receiver, a method of processing at least two multi-bit sample streams of a received optical signal, the method comprising steps of:
  processing the at least two multi-bit sample streams to compute an array $\{R^A{}_{X'}\}$ representative of a spectrum of the received optical signal;
  applying a selected frequency domain function to the array $\{R^A{}_{X'}\}$ to derive a modified array $\{V^A{}_{X'}\}$, wherein the step of applying the frequency domain function to the array $\{R^A{}_{X'}\}$ comprises steps of:
    selecting one of a set of two or more predetermined coefficient vectors; and
    multiplying the array $\{R^A{}_{X'}\}$ by the selected coefficient vector;
  deriving a time-domain output vector based on the modified array $\{V^A{}_{X'}\}$;
  wherein the set of two or more predetermined coefficient vectors comprises:
    a first coefficient vector containing coefficients calculated to at least partially compensate dispersion of the received optical signal; and
    a second coefficient vector containing coefficients calculated using a transform of a predetermined symbol sequence embedded in the optical signal, such that the complex output vector contains a cross-correlation of the sample streams and the predetermined sequence of symbols.

26. A method as claimed in claim 25, further comprising a step of outputting at least a portion of the modified array $\{V^A{}_{X'}\}$.

27. A method as claimed in claim 25, further comprising a step of outputting at least a portion of the complex output array independently of a main data path of the DSP.

28. A method as claimed in claim 25, wherein at least one coefficient vector contains coefficients calculated to correct quadrature error of the multi-bit sample streams.

29. A method as claimed in claim 25, wherein the predetermined symbol sequence is a SYNC burst embedded in the optical signal.

30. A method as claimed in claim 29, further comprising a step of adjusting a position of the SYNC burst within the complex output vector, based on a detected timing of the SYNC burst.

31. A method as claimed in claim 25, wherein the predetermined symbol sequence is a pilot channel signature embedded in the optical signal.

* * * * *